(12) United States Patent
Rasmussen et al.

(10) Patent No.: US 8,747,713 B2
(45) Date of Patent: Jun. 10, 2014

(54) METHOD AND APPARATUS FOR MANUFACTURE OF A POLYMER FILM, WHICH IS ORIENTED UNDER AN ANGLE TO ITS LONGITUDINAL DIRECTION

(76) Inventors: Ole-Bendt Rasmussen, Walchwil (CH); Nikolaj Wettergren Rasmussen, Walchwil (CH)

( * ) Notice: Subject to any disclaimer, the term of this patent is extended or adjusted under 35 U.S.C. 154(b) by 32 days.

(21) Appl. No.: 13/057,078

(22) PCT Filed: Jul. 22, 2009

(86) PCT No.: PCT/EP2009/059429
§ 371 (c)(1),
(2), (4) Date: May 17, 2011

(87) PCT Pub. No.: WO2010/015512
PCT Pub. Date: Feb. 11, 2010

(65) Prior Publication Data
US 2011/0210471 A1   Sep. 1, 2011

(30) Foreign Application Priority Data

Aug. 5, 2008 (GB) .................................. 0814308.3
Jan. 15, 2009 (WO) ................. PCT/EP2009/050412

(51) Int. Cl.
*B28B 7/14* (2006.01)

(52) U.S. Cl.
USPC ..................... 264/163; 264/210.7; 264/235.6; 264/235.8; 264/288.4; 264/290.2; 264/291; 264/292; 264/145; 264/146; 264/159; 264/160

(58) Field of Classification Search
USPC ......... 264/163, 148–151, 291, 292, 479, 480, 264/210.7
See application file for complete search history.

(56) References Cited

U.S. PATENT DOCUMENTS

| 3,954,933 A | 5/1976 | Rasmussen |
| 4,039,364 A | 8/1977 | Rasmussen |
| 4,084,028 A | 4/1978 | Rasmussen |

(Continued)

FOREIGN PATENT DOCUMENTS

| DE | 10116477 A1 | 10/2002 |
| EP | 1213223 | * 9/2001 |
| GB | 1 328 697 A | 8/1973 |
| WO | WO02102592 A | 12/2002 |

OTHER PUBLICATIONS

PCT International Search Report.

*Primary Examiner* — Jeffrey Wollschlager
*Assistant Examiner* — Stella Yi
(74) *Attorney, Agent, or Firm* — Robert W Strozier

(57) ABSTRACT

Flexible tubular film (10) is helically cut into a flat strip by unwinding the tubular film in flattened form by a tumbling unwinder (1), advancing the flat film tube to a tube expansion zone (17) in which the flat tube is expanded into a circular cylindrical tube and is passed axially over a hollow mandrel (14) slightly lower in external diameter than the diameter of the expanded tube to be cut by knife (18) helically while on the mandrel into a flat strip that is removed at an angle to the mandrel axis. The flat tube is longitudinally stretched by stretching rollers (107-112), which tumble with the tumbling unwinder. The apparatus further comprises stabilization means for stabilizing the orientation applied by the tumbling stretching rollers, applied to the helically cut film strip after it has been drawn from the mandrel.

11 Claims, 3 Drawing Sheets

(56) References Cited

U.S. PATENT DOCUMENTS

| | | |
|---|---|---|
| 4,115,502 A | 9/1978 | Rasmussen |
| 4,125,581 A | 11/1978 | Rasmussen |
| 4,143,195 A | 3/1979 | Rasmussen |
| 4,207,045 A | 6/1980 | Rasmussen |
| 4,229,394 A | 10/1980 | Rasmussen |
| 4,293,294 A | 10/1981 | Rasmussen |
| 4,294,638 A | 10/1981 | Rasmussen |
| 4,368,017 A | 1/1983 | Rasmussen |
| 4,377,544 A | 3/1983 | Rasmussen |
| 4,403,934 A | 9/1983 | Rasmussen |
| 4,407,877 A | 10/1983 | Rasmussen |
| 4,420,451 A | 12/1983 | Rasmussen |
| 4,421,810 A | 12/1983 | Rasmussen |
| 4,422,837 A | 12/1983 | Rasmussen |
| 4,430,284 A | 2/1984 | Rasmussen |
| 4,436,568 A | 3/1984 | Rasmussen |
| 4,439,260 A | 3/1984 | Canterino et al. |
| 4,440,709 A | 4/1984 | Rasmussen |
| 4,465,724 A | 8/1984 | Rasmussen |
| 4,492,549 A | 1/1985 | Rasmussen |
| 4,629,525 A | 12/1986 | Rasmussen |
| 4,636,417 A | 1/1987 | Rasmussen |
| 4,767,488 A | 8/1988 | Rasmussen |
| 4,793,885 A | 12/1988 | Rasmussen |
| 4,874,653 A | 10/1989 | Rasmussen |
| 4,908,253 A | 3/1990 | Rasmussen |
| 5,028,289 A | 7/1991 | Rasmussen |
| 5,205,650 A | 4/1993 | Rasmussen |
| 5,248,366 A | 9/1993 | Rasmussen |
| 5,330,133 A | 7/1994 | Rasmussen |
| 5,361,469 A | 11/1994 | Rasmussen |
| 5,626,944 A | 5/1997 | Rasmussen |
| 6,344,258 B1 | 2/2002 | Rasmussen |
| 6,787,206 B2 | 9/2004 | Rasmussen |
| 6,887,503 B1 | 5/2005 | Rasmussen |
| 7,001,547 B2 | 2/2006 | Rasmussen |
| 7,132,151 B2 | 11/2006 | Rasmussen |
| 7,820,271 B2 | 10/2010 | Rasmussen |
| 7,901,758 B2 | 3/2011 | Rasmussen |
| 8,066,924 B2 | 11/2011 | Rasmussen |
| 2004/0070105 A1 | 4/2004 | Rasmussen |
| 2004/0247730 A1 | 12/2004 | Rasmussen |
| 2005/0095411 A1 | 5/2005 | Rasmussen |
| 2005/0118304 A1 | 6/2005 | Rasmussen |
| 2007/0082188 A1 | 4/2007 | Rasmussen |
| 2007/0254120 A1 | 11/2007 | Rasmussen |
| 2007/0257402 A1 | 11/2007 | Rasmussen |
| 2007/0290416 A1 | 12/2007 | Rasmussen |
| 2008/0035714 A1 | 2/2008 | Rasmussen |
| 2009/0206510 A1 | 8/2009 | Rasmussen |
| 2009/0233041 A1 | 9/2009 | Rasmussen |
| 2010/0297387 A1 | 11/2010 | Rasmussen |
| 2010/0297401 A1 | 11/2010 | Rasmussen |
| 2011/0095448 A1 | 4/2011 | Rasmussen |
| 2011/0114249 A1 | 5/2011 | Rasmussen |

\* cited by examiner

METHOD AND APPARATUS FOR MANUFACTURE OF A POLYMER FILM, WHICH IS ORIENTED UNDER AN ANGLE TO ITS LONGITUDINAL DIRECTION

RELATED APPLICATIONS

This application is a U.S. Patent Application filed under 35 U.S.C. §371 claiming the benefit of and priority to PCT/EP2009/059429, filed Jul. 22, 2009 (22 Jul. 2009) (22 Jul. 2009) and published as WO 2010/015512 on Jul. 22, 2009 (22 Jul. 2009) (22 Jul. 2009), which claims the benefit of and priority to GB0814308.3, filed Aug. 5, 2008 (5 Aug. 2008) (5 Aug. 2008) and PCT/EP2009/050412, filed Jan. 15, 2009 (15 Jan. 2009) (15 Jan. 2009).

BACKGROUND OF THE INVENTION

1. Field of the Invention

The objective of the invention appears from the title. Obliquely oriented film is mainly used for manufacture of crosslaminates, whereby two or more such films are continuously brought together in a way to make their directions of orientation cross each other. The bonding may take place by a tie film extruded at the location where the oriented films meet (i.e. "extrusion lamination) or by heat and pressure through coextruded surface layers. The technology of producing crosslaminates is extensively described in WO 08/006858 (Rasmussen) published by WIPO. The polymer compositions of film, which have been industrially used in crosslaminates, have mainly been based on HDPE, LLDPE (and blends of the two) or crystalline PP.

2. Description of the Related Art

Almost all industrially used crosslamination technology makes use of helical cutting of oriented tubular film. The first patent to this effect is GB 816,607 (Rasmussen) which claims priority from 1954. A particularly practical way of carrying out such process and apparatus for such process are known from U.S. Pat. No. 5,248,366 (Rasmussen) and U.S. Pat. No. 5,361,469 (Rasmussen) both claiming priority from 1988.

The manufacture of an obliquely oriented film for crosslamination requires stabilization of the orientation prior to the lamination, otherwise the different films in the laminate will gradually build up internal tensions when stored on reel, the tensions having different directions in the different films corresponding to their different directions of orientation, and this will give the laminate a strong tendency to curl or roll up, when it is released from the reel. It is known that, with conventional technology, at least a part of this stabilization must take place before the oriented lay-flat tube is wound up, otherwise the film on the reel will become distorted, and the core of the reel may even be crushed.

As explained in WO 05/102669 (Rasmussen), the stretching is preferably carried out at a relatively low temperature, which for HDPE or PP films preferably is in a range of about 20-50° C., since this gives the best all-round strength properties. The latter refers to an adequate combination of tensile strength, yield point, tear propagation resistance and puncture resistance. However, the choice of low temperatures makes the choice of stabilization conditions more difficult, too low a stabilization giving the final crosslaminate a high tendency to curl, and too high a stabilization making the film too splittable, thereby reducing the tear propagation resistance of the crosslaminate. A part of the problem is that, under industrial conditions with relatively high film velocities, there has to be a relatively high tension in the machine direction of the film, i.e. parallel with its direction of orientation.

SUMMARY OF THE INVENTION

The present invention has the main purpose to reduce such stabilization problems, but has also the purpose to rationalize the production steps in the manufacture of crosslaminates. This is in particular important when making particularly thin crosslaminates, and thereby using the strength advantages to save raw material cost. Then it is important that such savings are not mainly offset by excessive conversion costs.

BRIEF DESCRIPTION OF THE DRAWINGS

The invention shall now be described in further detail with reference to the drawings, of which

DETAILED DESCRIPTION OF THE INVENTION

Figure 1:
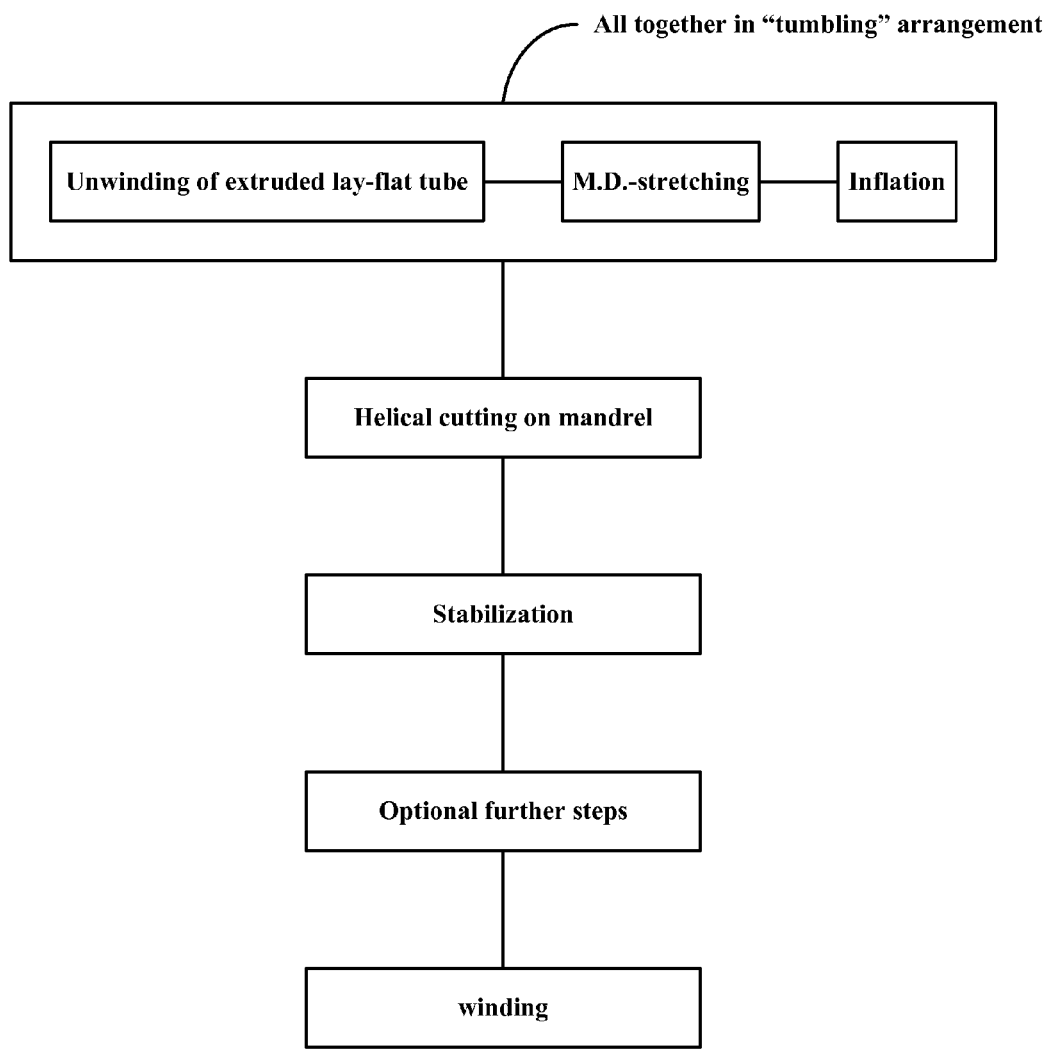
FIG. 1 is a flow sheet showing all process steps carried out in line.

In trials preceding the present invention the inventors stretched a relatively short length of lay-flat tubular 0.10 mm thick HDPE film at 20° C., and reeled it up without stabilizing it. Immediately afterwards it was helically cut under 45°, and then stabilized by passage over 70° C. warm rollers, closely spaced from each other. It was found that the stabilization thereby became more efficient and the splittability lower.

In accordance with this finding, the present invention consists in carrying out the stretching in the tumbling unwinder, which is used in connection with the helical cutting, and to carry out the stabilization after the helical cutting. More exactly expressed the invention concerns a method of manufacturing a polymer film which is uniaxially oriented under an angle to its longitudinal direction, in which a lay-flat tubular film is longitudinally oriented between stretching rollers and is stabilized, and subsequently to its orientation is helically cut by first being unwound from a reel (9) in an unwinding stand (5) which performs a tumbling movement to rotate the lay-flat tube around its longitudinally extending middle line, and then being inflated by dragging over a mandrel (16) and evenly propelled in a screwing movement. Hereby each point on the film surface follows a helix, and the cutting takes place by a knife (18) located in a fixed position, whereafter the helically cut film is pulled away from the mandrel. The invention is characterized in that said stretching rollers (108 to 112) are assembled in the tumbling unwinding stand to carry out the orientation as a step between the unwinding and the inflation of the lay-flat film, and is further characterised in that the stabilization is carried out after the helical cutting.

As regards the unwinding stand, two principally different constructions are possible, both shown in each of the above mentioned U.S. Pat. Nos. 5,248,366 and 5,361,469, FIGS. 1 and 3. In FIG. 1 the reel to be unwound is assembled in the tumbling unwind stand with its axis perpendicular to the axis of rotation, while in FIG. 3 the axis of the reel coincides with the axis of rotation of the stand, and there is installed a spinner which turns the film such that its middle line will coincide with the axis of rotation of the unwinder.

In the said two U.S. patents the lay-flat tuba is inflated to tubular shape by means of air, continuously blown through the mandrel, which is hollow. This air blows back to the ambience through the space between the outer surface of the mandrel and the inner surface of the tubular film, and thereby the passage of the film over the mandrel towards the cutting knife becomes air lubricated. Furthermore the film is guided during the inflation by means of conveyor belts. These two precautions, the use of blown air and of support belts, is also preferable, but is not mandatory in connection with the present invention. Alternatively rings of guide wheels arranged around the tip of the mandrel may carry out the inflation and the helical propelling of the tubular film. Such wheels must be driven in coordination with the rotation of the unwind stand and with the means in which unwind the film in this stand.

It has been found that the helically cut unstabilized film can be wound on a reel without causing any distortion, since the coefficient of elasticity (E) in the new machine direction is low, and therefore the needed stabilization can be carried out in a separate process line, but normally the stabilization should be carried out in line with the helical cutting.

Normally but not necessarily, the stabilization is established by heat, preferably by passing the film in S-path over a series of closely spaced heated rollers. The best result is achieved when these rollers also give the film a small stretching in the new machine direction, preferably between 5-10% stretching. This serves to "iron" out small creases or other irregularities in the film, at the same time as it reduces the splittability.

An alternative method of carrying out the stabilization, applicable especially when an embossed structure of the film is desirable, is to stretch the film by transverse stretching between intermeshing circular or helical grooved rollers. Hereby sharp edged grooved rollers produces the most significant embossment and the most efficient stabilization.

In one embodiment of the invention, the stretching in the unwind stand takes place between closely spaced grooved rollers, which the film passes in S-path. Between the unwinding and the stretching in the unwind stand the film may be supplied with longitudinally extending pleats over its entire width, the size of each pleat being sufficiently fine, and the distribution of the pleats being sufficiently even to make the pleating disappear during the stretching. By this precaution the film is allowed to follow its inherent tendency to reduce its width while the length is extended, and this facilitates the orientation process. Methods of pleating a film prior to longitudinal stretching are described in U.S. Pat. No. 3,233,029 (Rasmussen) and WO 09/056601 (Rasmussen).

As it will be understood from the foregoing, the present invention is useful in particular for stretching and helical cutting of low gauge film, where it is essential to simplify the manufacturing process and reduce the machine cost. Such low gauge film will already exhibit a relatively high melt orientation, thus the stretch ratio in the tumbling unwinding stand will be relatively low, e.g. between 1.5:1 and 2.5:1. Consequently the required depth of the pleats will be low and the devices for pleating relatively simple.

However, the stretching in the unwind stand between the closely spaced smooth rollers can also be carried out without a preceding pleating of the film. This means that the edges of the lay-flat tube will become thicker than the rest, since they reduce their transverse dimension, while the rest of the film is prevented from doing the same. Therefore the thickness reduction at the edges will be less than the thickness reduction over the rest of the film. In a conventional stretching procedure in which no rotation and helical cutting of the film takes place, this means that an orderly winding up of the stretched film is impossible, since the thicknesses at the edges accumulate and gradually distort the film. When using the present invention, the edges of the lay-flat tube will also be thicker than the rest, but after the helical cutting the original edges will form an angle to the machine direction, and the thickness differences will not accumulate when the film is wound on reel.

In another embodiment of the invention, at least a part of the stretching in the unwind stand is carried out between one or more pairs of rollers supplied with cogs extending in the direction of the roller axis, whereby the cogs in each pair of rollers intermesh with each other. Also in this case the film may be supplied with longitudinally extending pleats before it meets the first pair of cog rollers or alternatively the stretching may be carried out without such pleating.

The result of such cog roller stretching, which in itself is known art, will normally be a film in which the degree of orientation varies in sequences. This may in special cases be an advantage, namely when an embossed structure is wanted. It is also noted that there exists known technology in which two pairs of cog rollers, working in tandem, are coordinated such that together they form an almost evenly stretched film.

No matter which of the above embodiments of the invention is used, a suitable composition of the film can for most application conveniently contain 50% or more HDPE, LLDPE or crystalline PP, since the prices of these polymers are relatively low, their stretchability very good and the achievable strength high.

With reference to FIG. 1, the steps till and including "Helical cutting on mandrel" shall be described in connection with FIG. 2.

The step "stabilization" does normally mean stabilization by heat, but stabilization by passage between mutually intermeshing grooved rollers is also a possibility if an embossed shape of the film is acceptable or even wanted, and in very special cases stabilization by irradiation may be chosen.

A stabilization by heat will normally be carried out by passage over a series of rollers heated e.g. to 70-90° C. and closely spaced from one another. During this passage the film is preferably stretched, normally in a ratio between 1.05:1 and 1.2:1, since this can enhance the stabilization at the same time as the splitability is reduced. The rollers may be arranged in a similar fashion to those illustrated in FIG. 2 for tumbling stretching rollers (107)-(112).

A stabilization by passage between intermeshing grooved rollers will normally use circular grooved rollers, and in that case the pitch of grooves on each roller can mechanically be brought down to about 1.0-1.2 mm, which is advantageous. However, the grooving may also be helical. Such grooved rollers' stabilization can be carried out at ambient or elevated temperature.

The box "optional further steps" comprises different options. One is embossment. A second is fibrillation along the direction of orientation to form a fibrous network, as known from the art of fibrillating oriented films. Most important, however, this optional step can consist in crosslamination with a similar, simultaneously produced, obliquedly oriented film. However, crosslamination can also take place subsequently in a separate production line.

Figure 2:
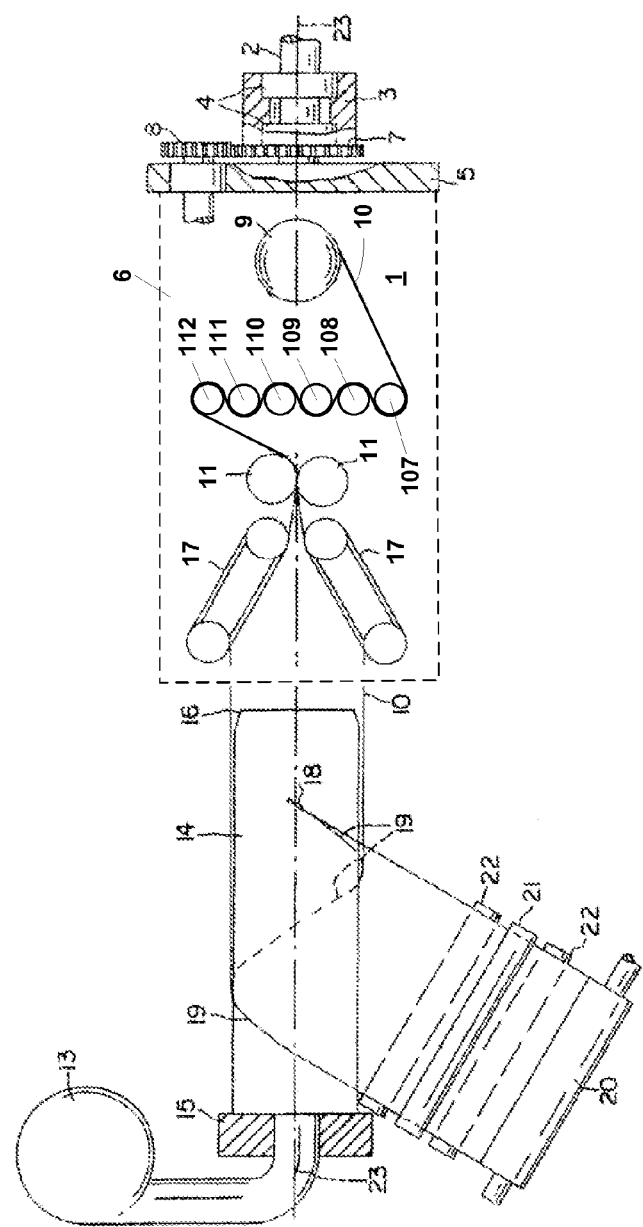
FIG. 2 is a principal sketch showing a view from above of the apparatus for carrying out the process steps from (reference to the flow sheet FIG. 1) unwinding of extruded lay-flat tube to helical cutting on mandrel. For the sake of simplification of the drawing, it shows the helically cut film being spooled up before stabilization, as it may actually be done, although the stabilization normally should be carried out in line with the helical cutting.

The apparatus of FIG. 2 includes "the tumbling stand" unit (1), which has a shaft (2) at one end and rotates around the axis of the shaft supported by a column (3) through heavy roller bearings (4). The column (3) is mounted on the floor of the room. For simplicity the unwind unit (1) is shown as having a housing consisting of an end plate (5) and two side plates (6). The drawing shows the unit at the time of rotation when these side plates are in a horizontal position and only the upper plate, indicated by dotted lines, can be seen. In practice a framework mainly of profile steel may be preferable to plates since it will be lighter and more convenient.

Figure 3:
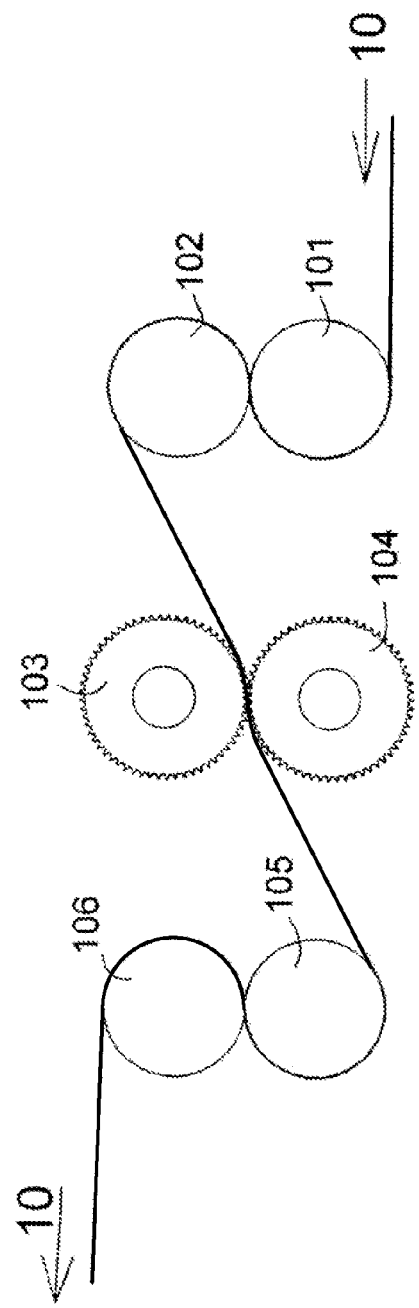
FIG. 3 shows a modification of the stretching system (rollers 107 to 112) of FIG. 2, namely a system in which the stretching partly takes place between intermeshing cog rollers (103 and 104). It is to be understood that the rollers (101) to (106) are mounted in "the tumbling stand" (1) such that they substitute rollers (107) to (112).

The "tumbling stand", unit (1) including the rollers which shall be described below, is too heavy to be supported through the heavy roller bearings (4) alone, and therefore this support is supplemented by one or more big steel rings, which surround and form part of the rotating unwind unit, and which stand and roll on a number of support rollers or support wheels and so serve as bearing rings. Alternatively, the support fixed to the floor may form part of one or more bearing rings, on which stand and roll one or more circular arrays of rollers or wheels, which surround and are mounted on the rotating unwind unit. Such system is shown in FIG. 3 of U.S. Pat. No. 5,248,366 (Rasmussen) and U.S. Pat. No. 5,361,469 (Rasmussen) but for the sake of simplification it is not shown in the present FIG. 2.

The support column (3) carries a fixed gear wheel (7) which is engaged with another gear wheel (8) mounted on the end plate (5) and therefore carries a planetary movement. The wheel (8) supplies the drive to the various rollers and wheels in the unit (1), but for simplicity the transmission for these movements is not shown.

A reel (9) of lay-flat, extruded tubular sheet (10) is mounted through bearings in the side plate and is supplied with a brake, the bearings and brake not being shown. The flat sheet (10) is taken off the reel (9) by means of a set of nip rollers (107) and (108), the latter being a driven steel roller, and the former being a rubber coated idle roller.

Steel roller (109) is closely spaced from (108) and is driven at the same circumferential velocity. Steel roller (110) is driven at a higher circumferential velocity selected to produce the wanted stretch ratio (variable by exchange of gear wheels or chain wheels). Steel roller (111) is driven at the same Circumferential velocity as (110) to take up a part of the stretching force, and (112) is a rubber coated nip roller. Nip rollers (11) rotate at the same circumferential velocity as (111) and (112).

In order to avoid a gradual heating of rollers (109) and (110), it is important that each of these rollers are kept at a constant temperature by means of a Circulating cooling/heating fluid, preferably water. For the entrance and exit of this water to and from the "tumbling stand" (1) the shaft (2) must consist of concentric pipes and be connected with a rotary fitting.

However, most conveniently there is arranged one circulating water system for rollers (108) and (109) to allow stretching at an elevated temperature, and another circulating water system for rollers (110) and (111) to cool the stretched film, both systems passing through the shaft (2) and the rotary fitting. For the sake of simplification these circulation systems are not shown.

Between the reel (9) and the first roller (107) in the line of stretching rollers the film (10) may be supplied with fine and evenly distributed pleats, which will allow transverse contraction during the longitudinal stretching. Devices for such pleating are, as mentioned above disclosed in U.S. Pat. No. 3,233,029 and WO 09/056601. When the film already has received an essential longitudinal melt orientation. and the ratio of stretching in the "tumbling unwinder" therefore is limited, e.g. to a range between 1.5:1 and 2.5:1, the pleating devices can be simplified e.g. to consist of a crownshaped idle roller and one pair of mutually intermeshing grooved rollers, as shown in the above mentioned U.S. Pat. No. 3,233,029.

The transmissions between the gear (8) and rollers (11), determines the cutting angle. Preferably the gear ratios are made variable, for instance by providing the possibility of changing the gear wheels. There is a cylindrical cutting mandrel (14), and an air jet to inflate the sheet (10) is blown by a fan (13), such as a centrifugal fan, through the mandrel towards the rollers (11).

The mandrel is mounted on the floor through a column (15) and makes a relatively tight fit with the tubular sheet (10) which slides over it. The air will escape through the narrow space between the mandrel and the sheet and will produce lubrication effect. The tip (16) of the mandrel may be rounded to avoid hang-up of the sheet.

It will be seen that the axis of the inflated tube (23) coincides at least substantially with the axis of rotation of the unwind unit 1, and the middle line of the lay-flat tubular film (10) passing between the rollers (11).

In order to achieve a smooth screw movement of the inflated tubular sheet, it is very advantageous (and may even be necessary if the sheet is wide) to provide a driven support from the first position to a position at which the tube is inflated. Appropriate support for the inflating tube may be a pair of belts, and as shown in FIG. 1 there are two pairs of driven belts (17) which support the tube against the backwardly directed force of the air emerging from the mandrel (14) towards the first position, and promotes a smooth change in shape of the tube from the flat shape to the cylindrical shape. The belts are driven at generally the same velocity as that of the sheet, or at a higher velocity. Instead of using two arrays of belts, a pair of single belts, or two arrays of rollers having a relatively small diameter (only the last roller needing to be driven) could be used. For a relatively narrow flat sheet, one pair of driven barrel-like rollers of a large diameter may be Sufficient.

The tubular sheet is cut by a simple knife or blade on a support (18) which conveniently can be fixed to the mandrel at an adjustable angle. The edge (19) that is shown on the drawing left of the knife, which becomes the right edge of the final sheet, moves first downwards and underneath the cutting mandrel. The knife may be rotating or vibrating to perform a sawing action.

The cut sheet is pulled by a driven winding unit (20) that is shown diagrammatically. The angle of out, as mentioned, is determined by the ratio between the speeds of rotating of the unit (1) and the rolls (11), but the direction of the knife or blade and of the pull exerted by the unit (20) must also be adjusted so that they approximately fit with the rotation-determined cutting angle. The winding unit (20) includes a dancer roller (21) and two auxiliary idle rollers (22) to control the speed of the winder (20) and thereby set up a convenient tension.

By appropriate adjustment of the air pressure inside the tube (relative to the ambient air pressure around the tube) high tensions can be applied by the unit (20) (except in the case of very fragile sheets, when lower tensions must be used). Thus, when cutting a flat sheet of about 100 micron gauge and 1 m wide, tensions of from 5 to 20 kg/m final width are normally applicable.

The roller arrangement shown in FIG. 3 can substitute the roller arrangement from roller (107) to roller (112) in FIG. 2.

It may even be arranged so that the two roller arrangements conveniently can be exchanged with each other in the same tumbling unwinder (1).

The film (10) enters the nip rollers (101) and (102), possibly in a finely and evenly pleated state as described above. Roller (102) is a driven steel roller, while roller (101) is a rubber coated idle roller. Rollers (103) and (104) are driven cog rollers, i.e. axial grooved rollers, the cogs extending parallel with the axes and being mutually intermeshing during the operation. (105) and (106) are nip rollers, (105) being a driven steel roller and (106) a rubber coated idle roller.

Between rollers (102) and (103) there is established a stretching, which is at about the limit for giving the film a permanent elongation. The main permanent elongation should normally be produced by the intermeshing between the cogs on rollers (103) and (104), but some further permanent elongation may be produced by stretching between roller (104) and roller (106).

We claim:

1. A method of manufacturing a polymer film comprising the steps of:
   unwinding a lay-flat tubular polymer film from a reel (9) in a tumbling unwinding stand (1) comprising stretching rollers (107-112 or 101-106), where the tumbling unwinding stand (1) performs a tumbling movement to rotate the lay-flat tubular polymer film around its longitudinally extending middle line,
   as the film is unwound uniaxially orienting and stretching the lay-flat tubular polymer film, within the tumbling unwinding stand (1), at an angle to the longitudinally extending middle line between (a) the stretching rollers (107-112), where the rollers (107-109) run at a first velocity, while the rollers (110-112) run at a second velocity greater than the first velocity causing the stretching providing a new machine direction to the lay-flat tubular polymer film or (b) the stretching rollers (101-106), where the stretching occurs between driven rollers (102) and (103) providing a new machine direction to the lay-flat tubular polymer film,
   dragging the stretched and oriented lay-flat tubular polymer film over a mandrel (16) to inflate the stretched and oriented lay-flat tubular polymer film and to evenly propel the polymer film in a screwing movement, where each point on the film surface follows a helical path,
   helically cutting the inflated stretched and oriented lay-flat tubular polymer film using a knife (18) located in a fixed position to form a helically cut uniaxially stretched and oriented polymer film,
   stabilizing the helically cut uniaxially oriented polymer film, and
   pulling away the helically uniaxially stretched and oriented cut film from the mandrel (16).

2. The method according to claim 1, wherein the stabilizing step is carried out in line with the helical cutting step.

3. The method according to claim 1, wherein the stabilizing step is carried out by heating the polymer film.

4. The method according to claim 3, wherein the stabilizing step is carried out by passing the polymer film in an S-path over a series of closely spaced heated rollers.

5. The method according to claim 4, wherein the polymer film is stretched in the new machine direction during this passing between 5 and 20%.

6. The method according to claim 1, wherein the stabilizing step is carried out by transverse stretching between intermeshing grooved rollers, the grooves of which are circular or helical.

7. The method according to claim 1, wherein the stretching in the tumbling unwinding stand is carried out between closely spaced smooth rollers, which the polymer film passes in an S-path.

8. The method according to claim 1, wherein at least a part of the stretching is carried out between one or more pairs of rollers supplied with cogs extending in the direction of the roller axis, the cogs in each pair of rollers intermeshing with each other.

9. The method according to claim 1, wherein between the unwinding and the stretching in the tumbling unwinding stand, the film is supplied with pleats over its entire width, a size of each pleat being sufficiently fine and the distribution of the pleats being sufficiently even to make the pleating disappear during the stretching.

10. The method according to claim 1, wherein 50% by weight or more of the polymer film comprises HDPE, LLDPE or crystalline PP.

11. The method according to claim 1, wherein the stretching further occurs between driven rollers (104) and (105).

* * * * *